_(12)_ United States Patent
He et al.

(10) Patent No.: US 8,041,319 B2
(45) Date of Patent: Oct. 18, 2011

(54) METHOD AND APPARATUS TO INTELLIGENTLY PERFORM SCANNING AND ASSIST SCANNING BY PROFILING SCANNING HISTORY

(75) Inventors: Haixiang He, Woburn, MA (US); Darwin A. Engwer, Pleasanton, CA (US)

(73) Assignee: Avaya Inc., Basking Ridge, NJ (US)

( * ) Notice: Subject to any disclaimer, the term of this patent is extended or adjusted under 35 U.S.C. 154(b) by 175 days.

(21) Appl. No.: 11/021,301

(22) Filed: Dec. 23, 2004

(65) Prior Publication Data

US 2006/0142004 A1 Jun. 29, 2006

(51) Int. Cl.
*H03D 5/00* (2006.01)
(52) U.S. Cl. ........ 455/144; 455/423; 709/227; 370/323; 370/332
(58) Field of Classification Search .................. 455/434, 455/435.2, 436, 452.2, 432; 370/329, 323, 370/332; 709/227
See application file for complete search history.

(56) References Cited

U.S. PATENT DOCUMENTS

| | | | | |
|---|---|---|---|---|
| 5,933,420 A * | 8/1999 | Jaszewski et al. | ............ | 370/329 |
| 6,119,003 A * | 9/2000 | Kukkohovi | ................ | 455/435.2 |
| 6,801,777 B2 * | 10/2004 | Rusch | ........................ | 455/452.2 |
| 6,950,628 B1 * | 9/2005 | Meier et al. | ................... | 455/41.2 |
| 2002/0025810 A1 * | 2/2002 | Takayama et al. | ............ | 455/432 |
| 2003/0035464 A1 * | 2/2003 | Dehner et al. | ................ | 375/132 |
| 2003/0186724 A1 * | 10/2003 | Tsutsumi et al. | ............. | 455/561 |
| 2003/0203735 A1 * | 10/2003 | Andrus et al. | ................ | 455/450 |
| 2003/0211866 A1 * | 11/2003 | Narazaki et al. | .............. | 455/561 |
| 2004/0002343 A1 * | 1/2004 | Brauel et al. | ............... | 455/456.1 |
| 2004/0066757 A1 * | 4/2004 | Molteni et al. | ................ | 370/329 |
| 2004/0066759 A1 * | 4/2004 | Molteni et al. | ................ | 370/329 |
| 2004/0120278 A1 * | 6/2004 | Krantz et al. | ................ | 370/328 |
| 2004/0223470 A1 * | 11/2004 | Smith | ......................... | 370/332 |
| 2005/0059397 A1 * | 3/2005 | Zhao | ........................ | 455/435.2 |
| 2005/0071476 A1 * | 3/2005 | Tejaswini et al. | ............. | 709/227 |
| 2006/0072507 A1 * | 4/2006 | Chandra et al. | ............... | 370/332 |

* cited by examiner

*Primary Examiner* — Charles Shedrick
(74) *Attorney, Agent, or Firm* — Chapin IP Law, LLC; David W. Rouille, Esq.

(57) ABSTRACT

According to one embodiment, a method involves determining whether a wireless connection between a first access point and a wireless station has failed. If so, a partial scanning process is conducted only on a subset of communication channels over which data is transmitted by access points neighboring the first access point. The subset of communication channels, inclusive of zero, is determined by analysis of a scanning history database.

19 Claims, 9 Drawing Sheets

US 8,041,319 B2

METHOD AND APPARATUS TO INTELLIGENTLY PERFORM SCANNING AND ASSIST SCANNING BY PROFILING SCANNING HISTORY

FIELD

Embodiments of the present invention relate to the field of networking. In particular, one embodiment of the invention relates to the scanning of communication channels for a wireless network based on profile scanning history and usage history, both of which provide feedback for future scanning operations.

BACKGROUND

The ability of users to access programs and share data over local area networks (referred to as "LANs") has become a necessity for most working environments. To improve efficiency and ease of use, certain enhancements such as mobile wireless access may be added to transform a LAN into a wireless LAN (WLAN). Commonly, WLANs are adapted to support wireless communications in accordance with the current Institute of Electrical and Electronics Engineers (IEEE) 802.11 standard. Herein, the "current IEEE 802.11 standard" represents the original 802.11 standard developed in 1997 as well as any or all enhancement standards already ratified (e.g., IEEE 802.11a/b/g/d/h/i).

For instance, in accordance with the current IEEE 802.11 communication standard, a wireless mobile device conducts a scanning process before it associates, namely establishes an Open Systems Interconnection (OSI) Layer 2 wireless link, with an access point (AP). This scanning may be conducted actively or passively through the detection of beacons for example. The scanning process is conducted quite frequently, typically when the mobile device needs to establish or re-establish communications with an AP in response to an event such as a power-down, dropout, or even general roaming where the mobile device needs to move from one AP to another AP. At this time, the mobile device conducts a scanning process in order to identify available candidate APs and to receive information concerning these APs. Based on this information and some local policies, the mobile device will select one AP and try to associate with the selected AP.

More specifically, in accordance with the current IEEE 802.11 standard, the conventional active scanning process involves the mobile device switching to a first channel (Channel 1), sending a PROBE REQUEST message and waiting for PROBE RESPONSE messages from neighboring APs. Thereafter, the mobile device switches to a second channel (Channel 2), sends another PROBE REQUEST message and waits for PROBE RESPONSE messages. The mobile device repeats the process until all of the channels have been scanned. For current IEEE 802.11b communications operating in the North American allocated frequency band, eleven (11) channels are scanned while current IEEE 802.11a communications involve twenty (20) channels.

Clearly, the active scanning process for multi-mode deployment communication schemes (e.g., IEEE 802.11a/b/g) is quite time consuming, which adversely affects network performance during roaming. In fact, for many WLAN applications including Voice-Over-Internet Protocol (VoIP) requiring a fifty-millisecond (50 ms) or faster transition time, the current scanning delay is not acceptable. As a result, there is continued interest to optimize the scanning process by minimizing scanning delays.

There have been attempts to optimize the scanning process, such as conducting an initial scanning of the most popular channels. For example, when supporting current IEEE 802.11b, the optimized scanning process for the mobile device would begin by scanning Channel 1, then scanning Channel 6 followed by Channel 11. The reason is that Channels 1, 6 and 11 are the most popular since they are fully non-overlapping. However, this optimized scanning process fails to provide a more efficient scanning process for all wireless networks, especially when Channels other than 1, 6 and/or 11 are in use.

BRIEF DESCRIPTION OF THE DRAWINGS

The features and advantages of the present invention will become apparent from the following detailed description of the present invention in which.

DETAILED DESCRIPTION

Herein, the exemplary embodiments of the invention relate to a method and apparatus for conducting a scan of wireless communication channels for a wireless network based on a profile of scanning and usage histories. The scanning and usage histories provide feedback for future scanning operations to assist a wireless device deployed within a wireless network to establish communications with another wireless device. One type of wireless network is a wireless local area network (WLAN) configured with a wireless communication protocol in accordance with a wireless communication standard, such as the IEEE 802.11 standard, HyperLAN, Bluetooth (IEEE 802.15) and other related standards. Herein, the term "IEEE 802.11 standard" represents the IEEE standard entitled "Part 11: Wireless LAN Medium Access Control (MAC) and Physical Layer (PHY) Specification," Edition 1999, Reaffirmed Jun. 12, 2003, as well as any or all enhancement standards already ratified (e.g., IEEE 802.11a/b/g/d/h/i) and to be ratified in the future (e.g., IEEE 802.11n).

In the following description, certain terminology is used to describe features of the present invention. For example, "logic" includes hardware and/or software module(s) that perform a certain function on incoming information. Examples of logic include a processor such as a microprocessor, application specific integrated circuit, digital signal processor, microcontroller, programmable logic array or the like. A "software module" is executable code such as an operating system, an application, an applet or even a routine for example. The module may be stored in any appropriate storage medium such as a hard drive, a CD-ROM, semiconductor memory (non-volatile or volatile), tape, etc.). The term "information" is defined as data, address, and/or control. For transmission, the information may be placed in a frame featuring a single packet or a series of packets, where each packet features a predetermined number of bits of information.

In addition, a "link" is broadly defined as one or more information-carrying mediums to establish a communication pathway. Examples of the medium include a physical medium (e.g., electrical wire, optical fiber, cable, bus traces, etc.) or a wireless medium (e.g., air in combination with wireless signaling technology).

I. General Architecture

Figure 1:
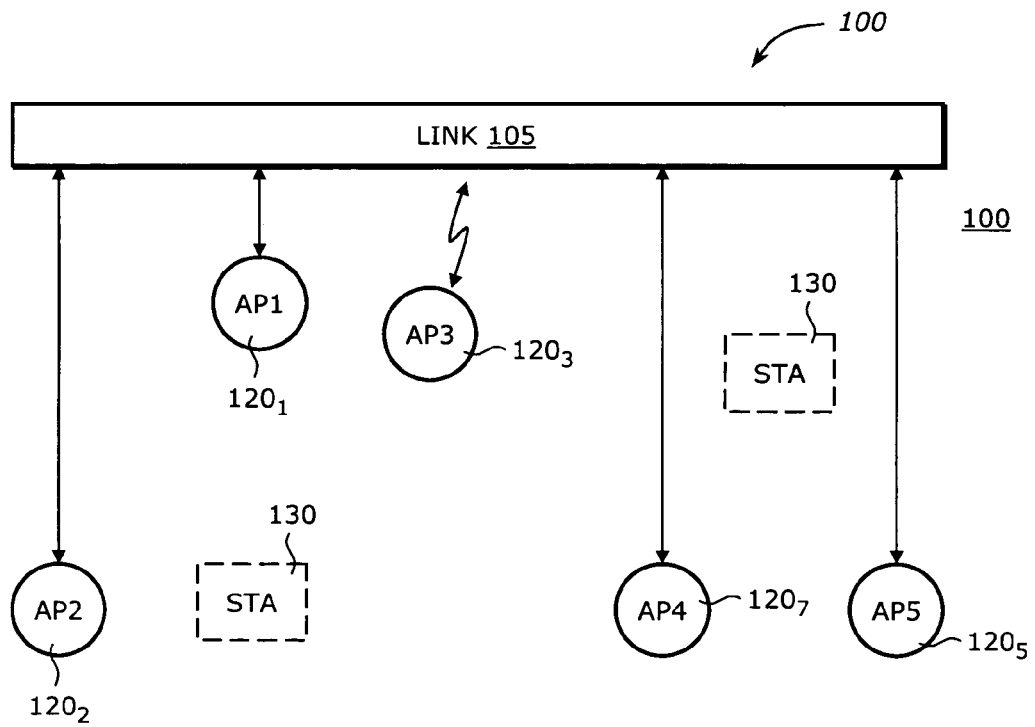
FIG. 1 is an exemplary embodiment of a wireless network.

Referring to FIG. 1, an exemplary embodiment of a wireless network 100 in accordance with the invention is illustrated. Wireless network 100 comprises a link 105 based on a physical medium. Herein, link 105 is part of a wired (backbone) network 110 that includes network resources available for users of wireless network 100. Wireless network 100 further includes one or more access points "APs" (e.g., APs $120_1$-$120_5$ that communicate via a wireless link with one or more wireless stations (STAs), including STA 130. For this embodiment, five (5) APs $120_1$-$120_5$ are in communication with link 105 as part of wireless network 100 as shown.

STA 130 can access network resources (e.g., servers, printers, computers, etc.) of wired network 110 via any of the APs $120_1$-$120_5$, which are generally transparent bridges that connect a wireless network defined by one or more STAs inclusive of STA 130 with the wired network 110. STA 130 communicates with APs $120_1$-$120_5$ typically using a wireless communication protocol.

For clarity sake, the wireless communication protocol will be compliant with the IEEE 802.11 standard, although the spirit and scope of the invention is applicable to other types of wireless communication protocols and wireless communication standards. In addition, well-known circuitry and frame formats are not set forth in detail in order to avoid unnecessarily obscuring the understanding of the invention.

A "wireless station" (e.g., STA 130) is defined herein as any wireless electronic device comprising (1) logic for processing information (e.g., a processor, state machine, etc.) and (2) a wireless transceiver for receiving information from and transmitting information to an AP or another wireless station. Examples of wireless electronic devices include, but are not limited or restricted to a computer (e.g., desktop computer, laptop computer, hand-held computer such as a personal digital assistant "PDA", server, etc.), communications equipment (e.g., pager, telephone, facsimile machine, etc.), entertainment equipment (e.g., portable audio players, video hand-held consoles, televisions, etc.), and the like.

An "access point" (e.g., APs $120_1$, . . . or $120_5$) is a wireless electronic device that provides a bi-directional connection between one or more STAs and a network such as wired network 110. Normally, APs are more stationary than STAs. In general, an AP supports a communication pathway between STA 130 and wired network 110. This communication pathway may be established through a wired connection back to wired network 110 as illustrated by AP $120_1$, or through a wireless connection back to wired network 110 as illustrated by AP $120_3$. Wired network 110 can be of any type, including an Ethernet, a token ring, or an asynchronous transfer mode (ATM) network.

Figure 2:
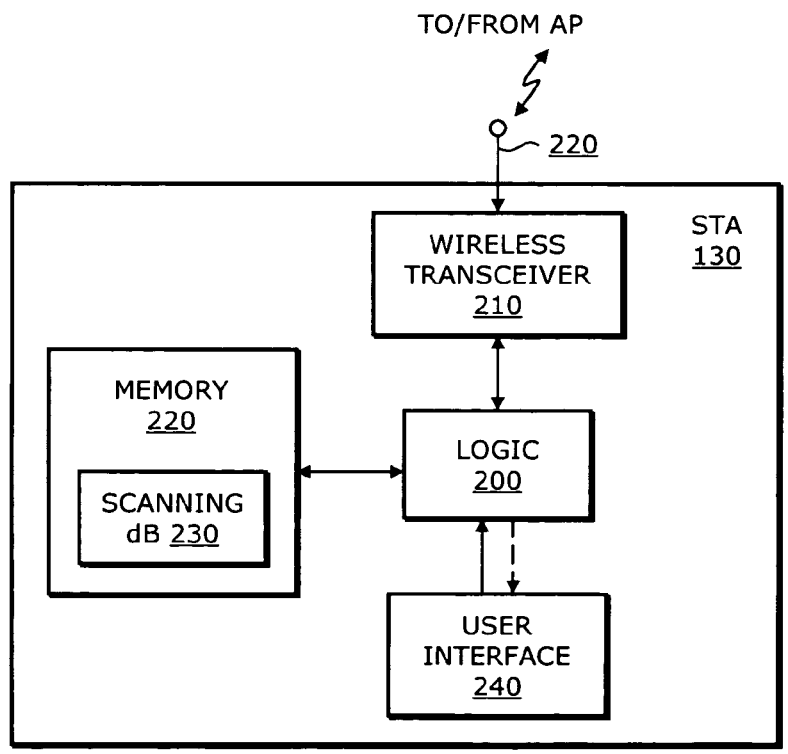
FIG. 2 is an exemplary embodiment of a wireless station (STA) of a wireless network.

Referring now to FIG. 2, an exemplary embodiment of wireless station (STA) 130 is shown. As shown, STA 130 comprises logic 200, a wireless transceiver 210, a memory 220 and a user interface 240. In particular, wireless transceiver 210 is adapted to receive messages from wireless devices forming wireless network 100 and extracts data from these messages for processing. Wireless transceiver 210 also receives data from logic 200 and produces one or more frames for transmission from STA 130.

As further shown in FIG. 2, the logic 200 (e.g., a processor) is coupled to wireless transceiver 210 and is configured to conduct scanning operations as well as to generate and maintain a scanning history database 230, which is stored in memory 220 and includes information obtained from prior scans as well as optional features such as AP selection results and/or STA local policies as described below and illustrated in FIG. 4. Optimized partial scanning operations performed by STA 130 may be based on information stored in scanning history database 230.

Memory 220 includes non-volatile memory to store scanning history database 230. Examples of non-volatile memory include one or more of the following: a hard disk drive, one or more semiconductor memories (e.g., flash, electrically erasable programmable read only memory "EEPROM", electrically programmable read only memory "EPROM", etc.), a removable memory unit (e.g., PCMCIA card, flash card, Universal Serial Bus "USB" storage device), and the like.

User interface 240 is adapted to receive information from and/or transmit information to a user of the STA 130. Such user interface 240 can include a keypad or keyboard, pointing device (e.g. a mouse, a track ball, etc.), a microphone, display, speakers, and other items used to convey and receive information to and from a user.

II. General Frame Transmissions During The Scanning Process

Figure 3A:
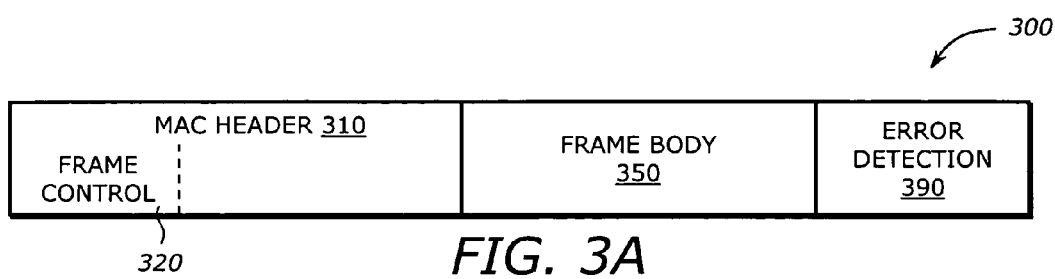
FIG. 3A is an exemplary embodiment of an IEEE 802.11 Medium Access Control (MAC) frame.

As shown in FIG. 3A, Medium Access Control (MAC) frames are exchanged between wireless devices in order to communication over wireless network 100. Each MAC frame 300 comprises a plurality of fields that occur in a fixed order. These fields include a MAC header 310, a frame body 350 and error detection 390.

Figure 3B:
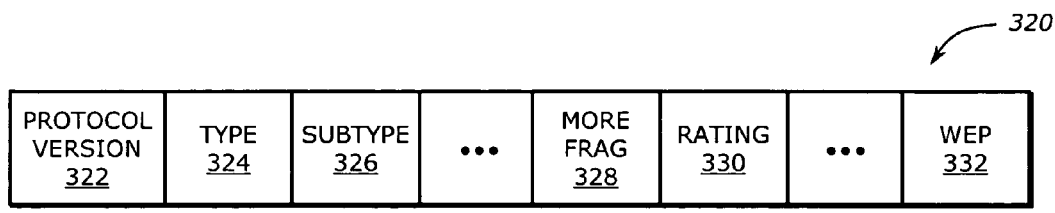
FIG. 3B is an exemplary embodiment of a MAC header of the MAC frame of FIG. 3A.

As shown in FIG. 3B, MAC header 310 comprises a frame control field 320 that identifies the type and general functionality of MAC frame 300. Frame control field 320 includes, but is not limited or restricted to the following: a Protocol Version field 322, a Type field 324, a Subtype field 326, a More Fragments field 328, a Retry field 330 and a Wired Equivalent Privacy (WEP) field 332.

Protocol Version field 322 is used to identify the particular revision of the IEEE 802.11 standard under which MAC frame 300 was created. This information enables a wireless device to detect incompatibility issues upon receiving a frame with a higher revision level than it supports.

Type and Subtype fields 324 and 326 identify the frame type of MAC frame 300. According to this embodiment, MAC frame 300 may be one of three different frame types: control, data and management. Each of these frame types has several defined subtypes. For instance, a Beacon frame is a management frame (Type="00") with a beacon subtype (Subtype="1000"). Both Probe Request and Probe Response frames are also management frames (Type="00") identified by different coded values ("0100" and "0101") within Subtype field 326.

More Fragments field 328 identifies whether other information follows MAC frame 300 while the Retry field 330 identifies whether MAC frame 300 is a retransmission of an earlier frame. WEP field 332, when set, identifies whether frame body 350 of FIG. 3A contains information that has been processed by the WEP algorithm. Normally, management frames used for scanning do not set the WEP field 332 because frame body 350 is not encrypted.

A. Passive Scanning

Figure 3C:
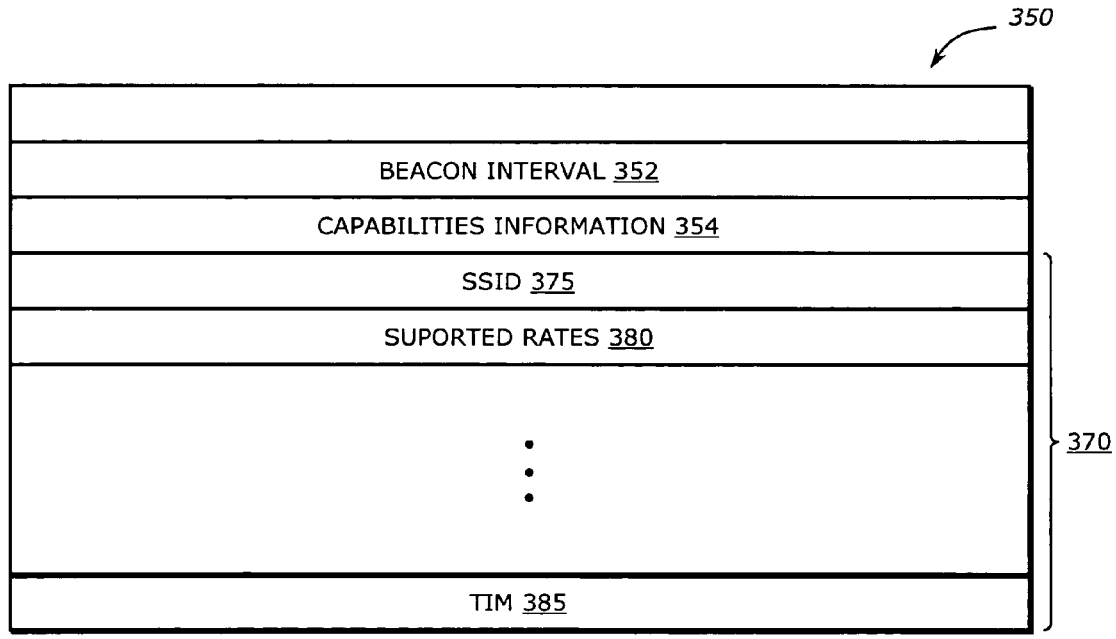
FIG. 3C is an exemplary embodiment of the information elements present in a Beacon or Probe Response MAC management Frame.

For passive scanning, the STA receives periodic Beacon frames, which are identified through analysis of the Type and Subtype fields 332 and 334 of MAC header 310. The STA may be configured to extract information from frame body 350 for use in populating the scanning history database 230 of FIG. 2. For Beacon frames, as shown in FIG. 3C, frame body 350 includes, but is not limited or restricted to the following: a Beacon Interval field 352, a Capabilities Information field 354 and a plurality of information elements 370 such as a Service Set Identity (SSID) 375 of the AP, supported rates 380 and a traffic indication message (TIM) 385. Each of the information elements (IEs) is structured to include an element identifier (ID), namely a code value to identify the particular IE, an Information field having information associated with the IE, and a Length field that specifies the number of octets in the Information field. The information associated with the IE has a variable length, depending on the particular IE.

Figure 3D:
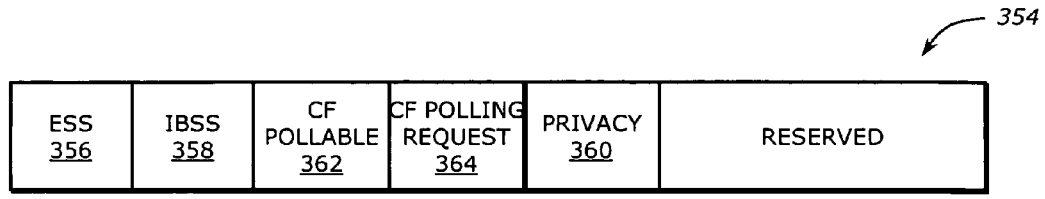
FIG. 3D is an exemplary embodiment of a Capabilities Information field within a frame body field of a Beacon or Probe Response frame being MAC management frames.

Beacon Interval field 352 represents the number of time units between successive Beacon frame transmissions. This information is useful to coordinate the scanning time periods for the STA. Capabilities Information field 354 contains a number of subfields that are used to provide requested or advertised capabilities of the AP, some or all of which may stored in the scanning history database as described below. For example, as shown in FIG. 3D, an Extended Service Set (ESS) and Independent Basic Service Set (IBSS) subfields 356 and 358 are set within transmitted Beacons and Probe Response management frames in order to provide information regarding the general construct of the wireless network featuring the AP. Privacy subfield 360 is used to identify whether WEP encryption is required for communication of data frames.

Other subfields of Capabilities Information field 354 may be used to identify whether the MAC sublayer of the AP supports Point Coordination Function (PCF) or Distributed Coordination Function (DCF). This is accomplished by two subfields, namely a Contention-Free (CF) Pollable subfield 362 and a CF-Polling subfield 364. "CF-Pollable" subfield 362 identifies that the STA supports operation in Point Coordination mode. CF-Polling subfield 364 is one way of implementing CSMA/CA wherein the access point polls each device on the network incrementally, providing a Clear to Send window. This is useful when transmitting audio or video streams because of the strict synchronization that is provided.

Other subfields of Capabilities Information field 354 may include security capabilities, AP loading information etc.

With respect to the plurality of information elements (IEs) 370, SSID 375 indicates the identity of an ESS to which the AP is a member. Supported Rates IE 380 is a code value that specifies the data rates supported by the AP. The Basic Rate Set is a code value that specifies the requisite data rates that need to be supported by the STA. This enables the STA to avoid associating with a BSS if the STA does not support all of the basic data rates.

Figure 3E:
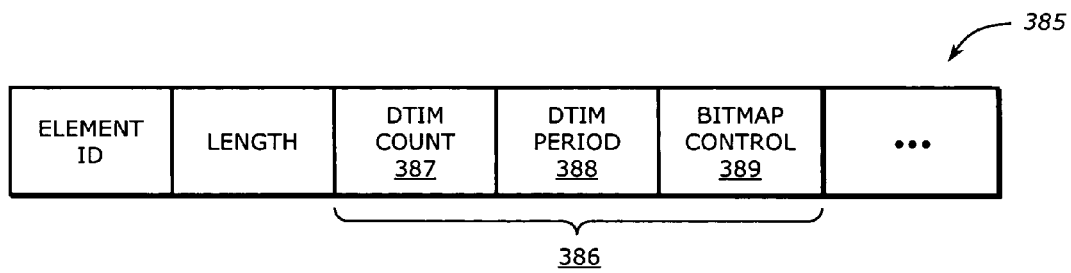
FIG. 3E is an exemplary embodiment of the TIM information element within a frame body field of a Beacon or Probe Response frame.

Referring to FIG. 3E, an exemplary embodiment of the TIM IE 385 within frame body 350 of a Beacon frame is shown. The TIM IE 385 comprises an information field 386 that includes at least a delivery traffic indication message (DTIM) Count field 387, a DTIM Period field 388 and a Bitmap Control field 389. DTIM Count field 387 is a single octet that indicates how many TIMs (including the current frame) appear before the next DTIM. If the value of the DTIM Count field 387 is zero, the beacon is a DTIM. The DTIM Period field 388 is a single octet that indicates the number of TIM intervals between successive DTIMs. The Bitmap Control field 389 is a variable length set of octets that includes one or more traffic indicator bits. When one or more broadcast or multicast data frames are buffered at the AP, the DTIM Count field 387 is zero and the traffic indicator bit (TIB) is set to denote pending subsequent transmissions. Hence, upon receipt of the Beacon, any wireless device is aware that one or more multicast or broadcast data frames will be transmitted subsequent to the DTIM.

It is contemplated that STA extracts some or all of the information from the Capabilities Information field 354 of frame body 350 as well as MAC header 310 fields of the Beacon frame and stores this information within the scanning history database 230 of FIG. 2. A further discussion of stored content of the scanning history database is set forth below.

B. Active Scanning

Figure 3F:
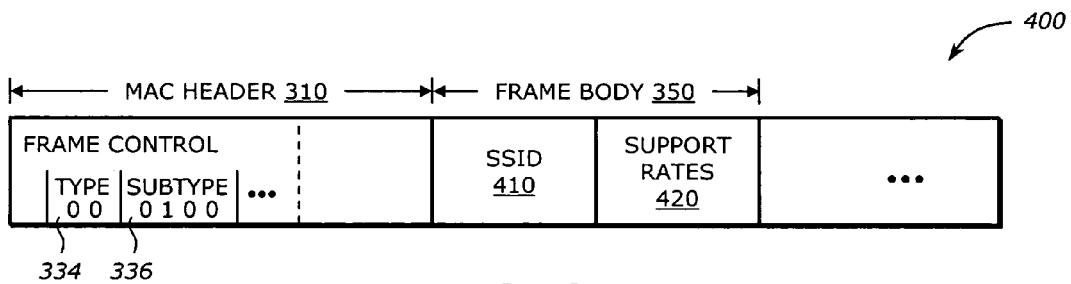
FIG. 3F is an exemplary embodiment of a MAC frame configured as a Probe Request management frame.
Figure 3G:
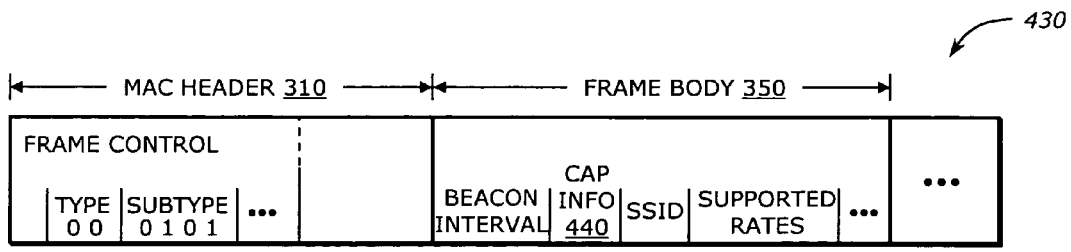
FIG. 3G is an exemplary embodiment of a MAC frame configured as a Probe Response management frame.

For active scanning, the STA generates a Probe Request frame 400, which is a management frame that can be identified by neighboring APs through analysis of the Type and Subtype fields 332 and 334 of MAC header 310. For a Probe Request frame 400, as shown in FIG. 3F, frame body 350 includes, but is not limited or restricted to the two information elements (IEs): a SSID 410 and Supported Rates 420. In response to receiving a Probe Request frame 400, each responding AP transmits a Probe Response frame 430 to the STA. As shown in FIG. 3G, Probe Response frame 430 features a frame body having fields and information elements substantially equivalent to those found in the Beacon frame of FIG. 3C, except for the TIM information element. Some or all of the information provided by the MAC header and frame body of Probe Response frame 430, including information within Capabilities Information field 440 of frame body, is extracted by the STA and loaded into appropriate entries of the scanning history database.

III. Scanning History Database

Figure 4:
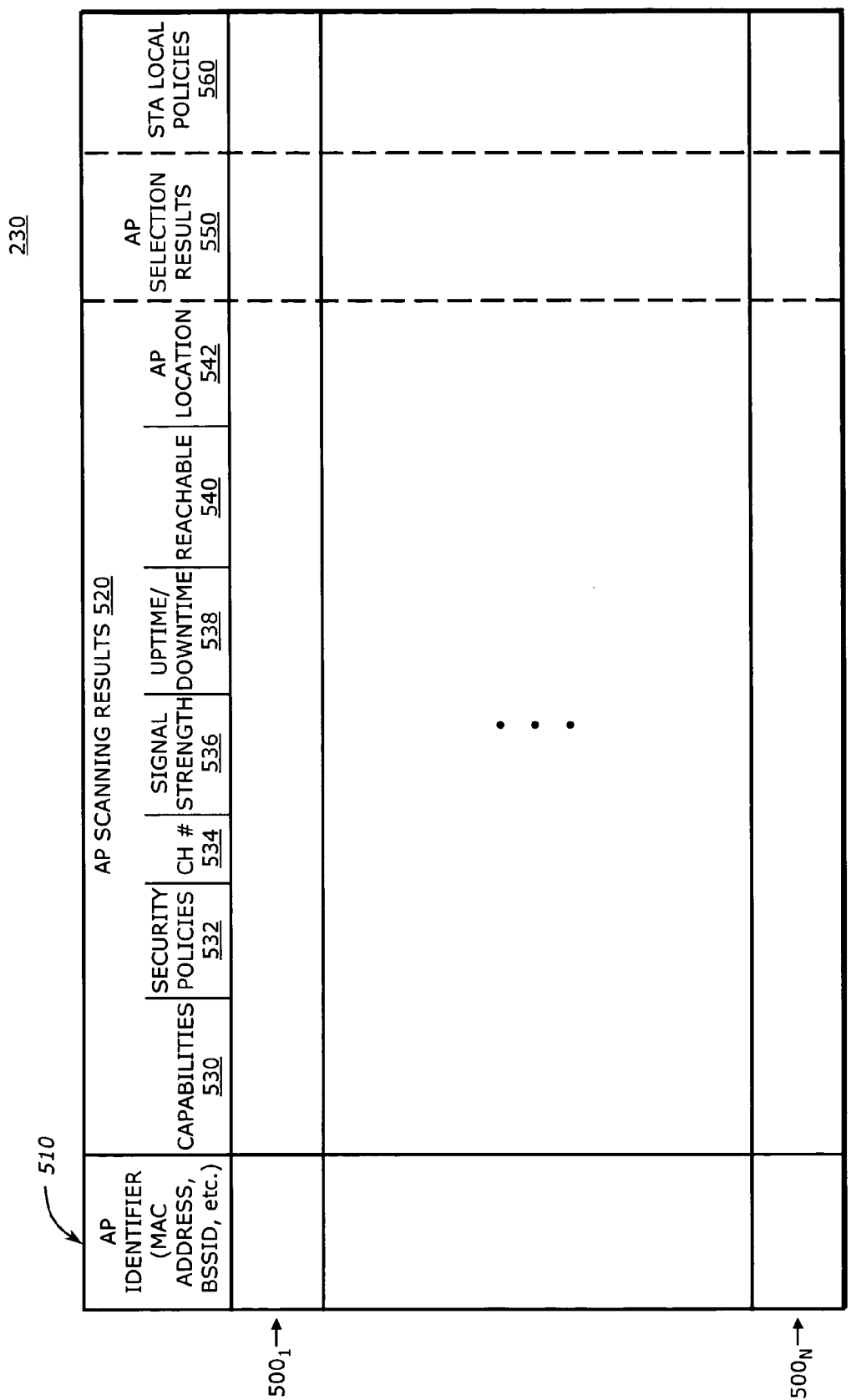
FIG. 4 is an exemplary embodiment of an entry of a scanning history database stored within memory accessible by the STA.

Referring now to FIG. 4, an embodiment of the scanning history database 230 of FIG. 2 is shown. Scanning history database 230 is a conceptual database that contains the results of scans and computations conducted by STA 130 as well as the recordation of the STA's local policies during these scans and AP selection results. It is noted that scanning history database 230 can be maintained over a long period of time, even across a power cycle of STA 130 of FIG. 1.

In accordance with one embodiment of the invention, STA 130 of FIG. 1 conducts a passive scanning process in order to receive Beacon frames from neighboring APs. The Beacon frames are transmitting over a selected communication channel and STA 130 extracts information therefrom. According to another embodiment of the invention, STA 130 conducts an active scanning process, which prompts receipt of a Probe Response frame. Similarly, the Probe Response frames are transmitting over a selected communication channel and STA 130 extracts information therefrom.

As a result, scanning history database 230 generally provides STA 130 with a mathematical network map, namely information concerning the logical relationship between APs $120_1$-$120_5$ of FIG. 1 communicating with STA 130. For example, STA 130 may (over time) construct a mathematical network map indicating that AP $120_2$ has neighbors $120_1$, and $120_4$; AP $120_1$, has neighbors $120_2$ and $120_3$; AP $120_3$ has neighbors $120_1$, and $120_4$; AP $120_4$ has neighbors $120_2$, $120_3$ and $120_5$; AP $120_5$ has neighbor $120_4$. "Neighbor" in this context means the subset of candidate APs normally selected for maintaining communications with STA 130 when a given AP is no longer available as described below.

Within scanning history database 230, each entry $500_1$-$500_N$ (where $N \geq 1$) represents an AP and can be indexed by an identifier 510, which is information used to identify the particular AP. According to one embodiment of the invention, identifier 510 may be a Medium Access Control (MAC) address of the AP, i.e. the Basic Service Set Identifier (BSSID) of the AP. These identifiers may be extracted from the Source address and BSSID fields within the MAC header of incoming management frame(s) (e.g., Beacon or Probe Response frames). Of course, it is contemplated that other information may be used for identification of the AP in lieu of the MAC address or BSSID.

Each database entry $500_1$-$500_N$ is further adapted to contain scanning results 520, namely information acquired from the APs during the scanning process. These scanning results 520 include one or more of the following: (1) capabilities 530, (2) security policies 532, (3) channel number 534, (4) signal strength 536, (5) uptime/downtime 538, (6) reachable/unreachable status 540, and/or (7) location information 542 of the AP.

More specifically, as set forth above, AP capabilities 530 feature requested or advertised capabilities of the transmitting AP. These AP capabilities may be retrieved from the Capabilities Information fields within the frame body of the management frame (e.g., field 354 of Beacon frame of FIG. 3C or field 440 of Probe Response frame of FIG. 3G).

Security policies 532 is a value that identifies what security policies, if any, are supported by the particular AP. As an example, the particular AP may support WEP or another type of networking security policy. This information may be provided by WEP field 332 of FIG. 3B within MAC header 310 of a management frame.

Channel number 534 identifies the communication channel over which the AP transmitted information to STA 130 while signal strength 536 provides a value that represents the signal strength in measured units (e.g., decibels, dbM0, etc.) of signal transmissions from the AP. This information may be determined and measured by STA 130 during receipt of management frames.

The uptime/downtime 538 is information that provides information concerning the normal operations of the AP as computed by STA 130. For instance, according to one embodiment of the invention, uptime/downtime 538 may indicate a percentage of time that the AP is operational. For instance, according to one embodiment of the invention, uptime/downtime can be measured as a percentage based on the number of Beacon frames received by STA 130 during a predetermined time period and the number of Beacons frames expected to be received during the predetermined time period. Alternatively, it may be measured based on what percentage of Probe Request frames successfully receive Probe Response frames within a predetermined time period.

According to another embodiment of the invention, uptime/downtime 538 may be adapted to indicate various time periods that the particular AP is normally operational or inoperative. For example, uptime/downtime 538 may identify that the particular AP is operational during extended business hours 8:00 A.M. to 8:00 P.M., but is turned off and inoperative outside this time period.

Additionally, STA 130 may be adapted to compute reachable/unreachable status 540. This status information can be used to identify whether or not the particular AP is reachable by determining whether the management frame from the AP is received with a measured signal strength that is above a minimal threshold.

AP location information 542 identifies the geographical position of the AP. This information is used in order to assist in the computations involving profiling of available channels and AP neighbors in order to generate a mathematical network map as described above. AP location information 542 may be global positioning satellite (GPS) data or other information used for identifying the location of the particular AP. According to one embodiment of the invention, this information is extracted from the incoming management frame.

Besides scanning results 520, it is contemplated that each entry $500_1$-$500_N$ of scanning history database 230 may further comprise (i) AP selection results 550 (i.e., usage history) and (ii) STA local policies 560 during these scans. AP selection results 550 provide information pertaining to the results of AP selection processes. For instance, according to one embodiment of the invention, AP selection results 550 identify the likelihood that certain APs are selected over other APs based on prior selection histories. This likelihood may be represented as percentages of selection or ratios between the particular AP and other APs discovered by the STA.

According to another embodiment of the invention, AP selection results 550 may indicate patterns of AP selection. For instance, this information may be used to identify patterns where one AP is selected after a previous AP becomes unavailable. For example, using wireless network 100 of FIG. 1, AP1 $120_1$ may be normally selected for maintaining communications with STA 130 when AP2 $120_2$ is no longer available. Similarly, AP3 $120_3$ may be normally selected for maintaining communications with STA 130 when AP2 $120_2$ is no longer available. This selection pattern provides a general mathematical network map of APs $120_1$-$120_5$.

STA local policies 560 provide additional information to prioritize the stored information within the scanning history database. For instance, STA local policies 560 associated with APs in the work environment may indicate that the transmission of data frames to APs require stronger encryption than provided by WEP. Thus, APs may be selected based on their ability to support higher security communications. However, STA local policies associated with non-work environment may place little to no importance on the AP supporting WEP or any higher level encryption function.

Although not shown, scanning history database 230 may be configured to include beacon timing information, so that the STA knows exactly when to change to the AP on which it will do a partial passive scan in order to receive a beacon from that AP. This may require prior storage of the AP's beacon interval and beacon transmit time, which is referenced to the beacon's TSF header value and the STA's own internal clock timer.

IV. Partial Scanning Process

Figure 5:
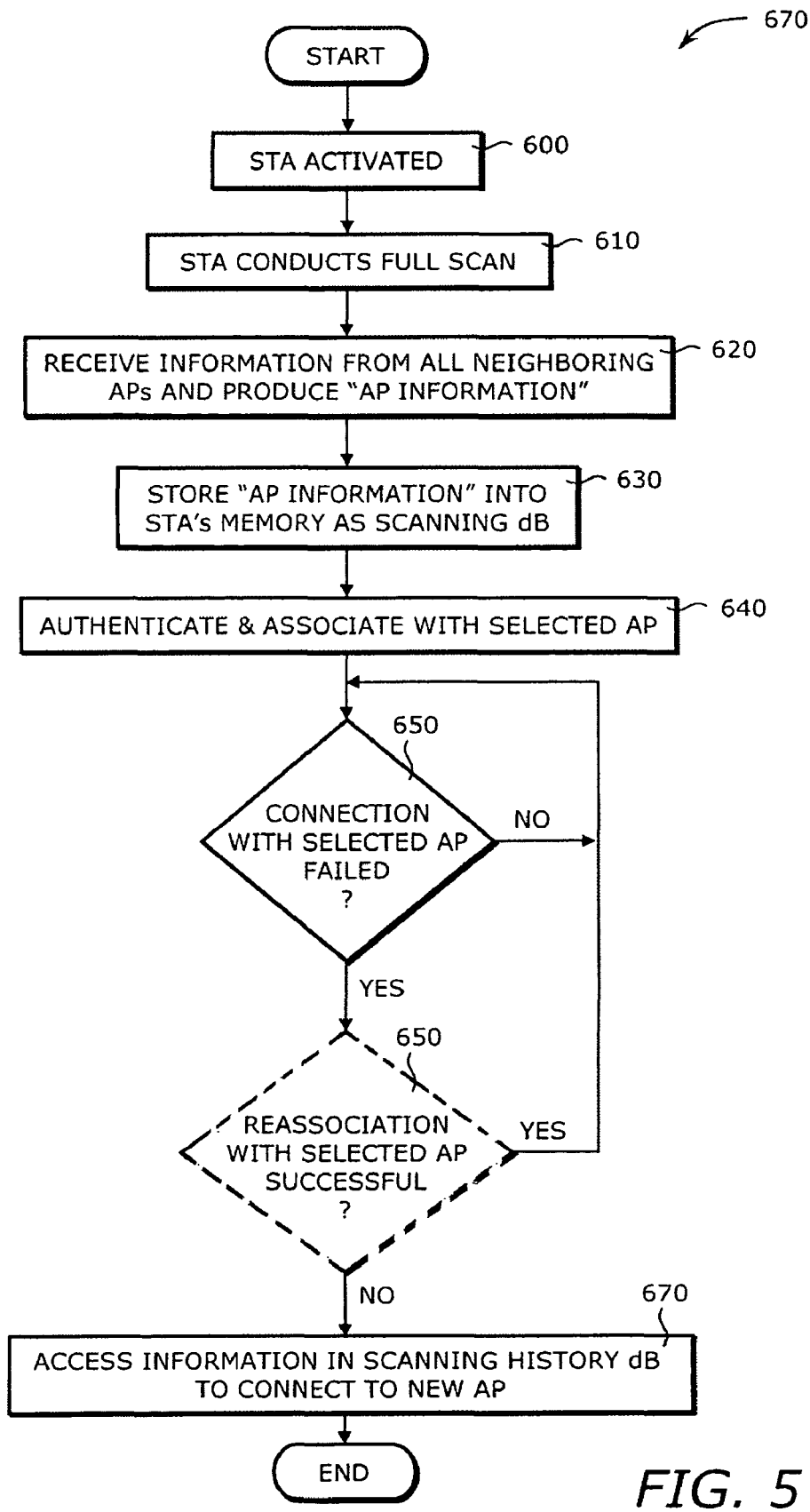
FIG. 5 is an exemplary embodiment of a flowchart illustrating a scanning process for associating with a selected AP and storing the scanning history and usage history within the scanning history database of FIG. 4.

Referring now to FIG. 5, an exemplary embodiment of a flowchart illustrating an initial scanning process for associating with a selected AP and storing the scanning history and usage history within the scanning history database of FIG. 4 is shown. Initially, the STA is activated and then conducts a full scan of the available wireless communication channels for the wireless network (see blocks 600 and 610). Upon conducting the full scan operation, the STA receives information from all neighboring APs (e.g., AP1-AP3 of FIG. 1) that are in communication with STA and performs further computations using this information to produce the AP information (block 620). The STA stores the AP information into appropriate entries of the scanning history database (block 630).

Thereafter, STA selects a particular AP (AP2) and then authenticates and associates with the selected AP (AP2) in order to establish a wireless connection to the selected AP (block 640). The wireless connection is continuously or periodically monitored to determine whether the wireless connection has failed (block 650). This failure may be caused by a loss of signal from the selected AP, prolonged receipt of signals having a signal strength below a minimum threshold, and the like.

If the wireless connection has failed, as an option as identified by dashed lines, the STA may attempt to re-associate with the selected AP, and if the connection is re-established with acceptable signal strength, the STA continues to use the selected AP as its pathway to the wired network (block 660). If re-association is unsuccessful, however, the STA accesses the AP information in the scanning history database in order to conduct an optimized, partial scanning process when associating with a new AP (block 670). Examples of certain embodiments of the partial scanning process are set forth in FIGS. 6A-6D.

In the event that the partial scanning process is unable to identify a neighboring AP that provides an acceptable wireless connection, the STA would conduct a full scan for all available APs on channels supported by the wireless network.

Figure 6A:
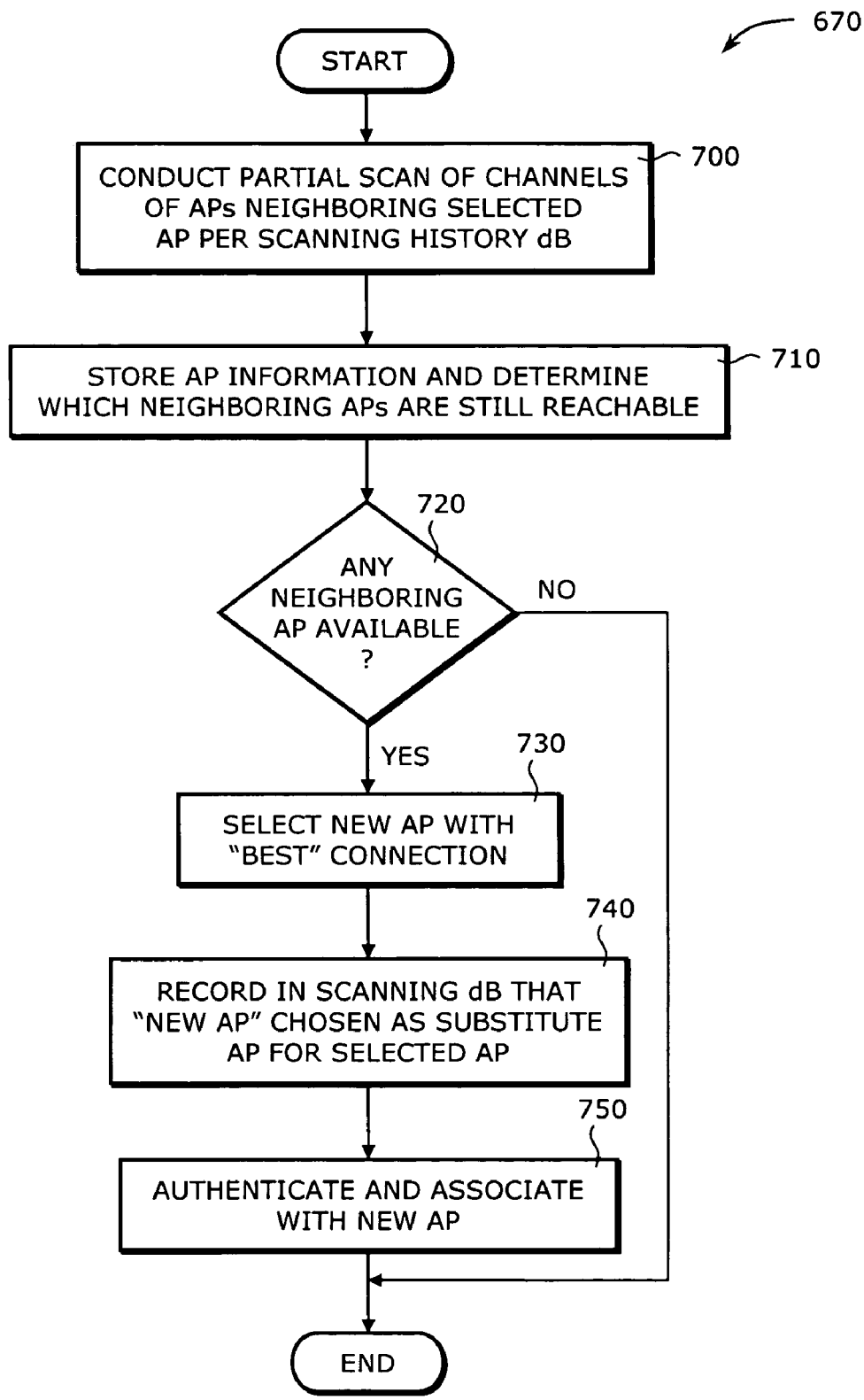
FIG. 6A is a first exemplary embodiment of a partial scanning process based on the scanning history and usage history stored within the scanning history database of FIG. 4.

Referring now to FIG. 6A, a first exemplary embodiment of a partial scanning process based on the scan history and usage history stored in the scanning history database in order to associate with a new AP is shown. Initially, the STA conducts a partial scan of channels of APs neighboring the selected AP (block 700). This partial scan is performed based on the mathematical network map the STA has developed from the AP information stored in the scanning history database.

For instance, the STA may actively scan only those APs that are listed in the scanning history database as being reachable. According to another embodiment, the STA may actively scan only those APs that are listed in the scanning history database as being reachable and previously provided signals with a measured signal strength above a predetermined threshold.

After the partial scan is conducted, the STA stores the AP information within the scanning history database and determines which neighboring APs (AP1, AP3) are still available, namely communications with the AP(s) would satisfy certain threshold requirements for establishing communications with the STA (block 710). If any neighboring APs are available, the STA selects a new AP (AP1) with the best overall connection after analysis of the AP information (blocks 720 and 730). This analysis may be conducted with certain AP information (e.g., signal strength, location, up/down time, etc.) weighted more heavily than other AP information, although a weighted analysis is not required.

The STA records within the scanning history database that the new AP (AP1) was chosen as the substitute for the previously selected AP (AP2) (block 740). This AP information constitutes usage history and is stored as part of the AP selection results associated with the new and previously selected APs. This usage history can be later used in order to more quickly determine substitute APs for a loss connection with a previous AP. After the new AP is selected, the station authenticates and associates with the new AP (block 750).

Figure 6B:
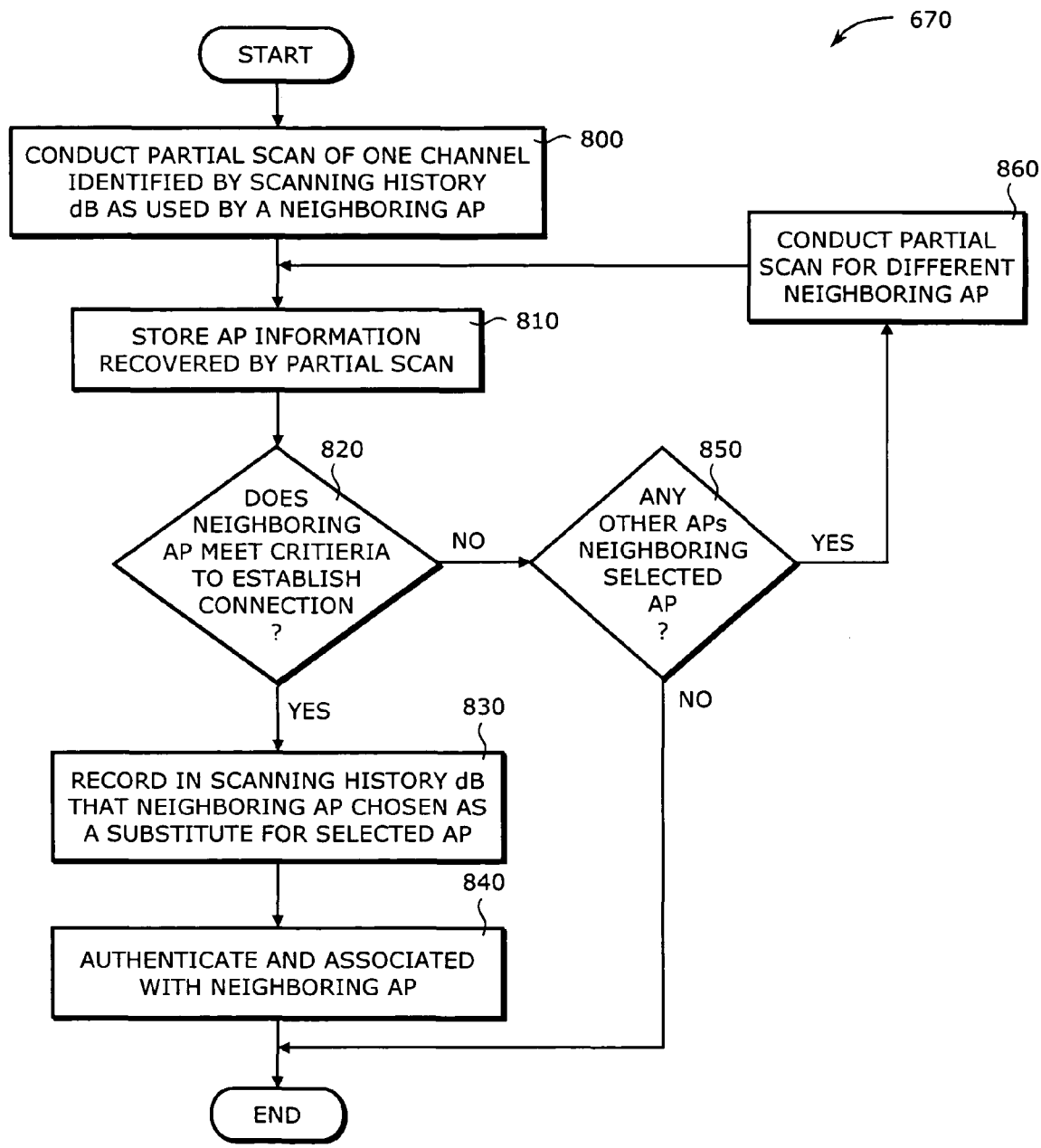
FIG. 6B is a second exemplary embodiment of a partial scanning process based on the scanning history and usage history stored within the scanning history database of FIG. 4.

Referring now to FIG. 6B, a second exemplary embodiment of a partial scanning process based on the scanning history and usage history stored within the scanning history database of FIG. 4 is shown. As shown in block 800, the STA conducts a partial scan of one channel identified by the scanning history database as being used by a neighboring AP (AP1). The AP information recovered and computed from the partial scan results is stored in the scanning history database (block 810). A determination is made whether the neighboring AP satisfies certain criteria so that the STA can establish a wireless connection with the neighboring AP (block 820). If so, the STA records within the scanning history database, in particularly as part of the AP selection results, that the neighboring AP (AP1) was chosen as a substitute for a previously selected AP (AP2) (block 830). The STA authenticates and associates with the neighboring AP (block 840).

If the neighboring AP does not meet criteria to establish a connection, a determination is made as to whether there are any other neighboring APs (AP3) as shown in block 850. If not, the partial scanning process ends. If so, a partial scan is conducted for a different AP (AP3), and the information is again stored in the scanning history database and determinations are made whether the newly scanned AP meets the criteria to establish a wireless connection (blocks 860, 810, 820).

Figure 6C:
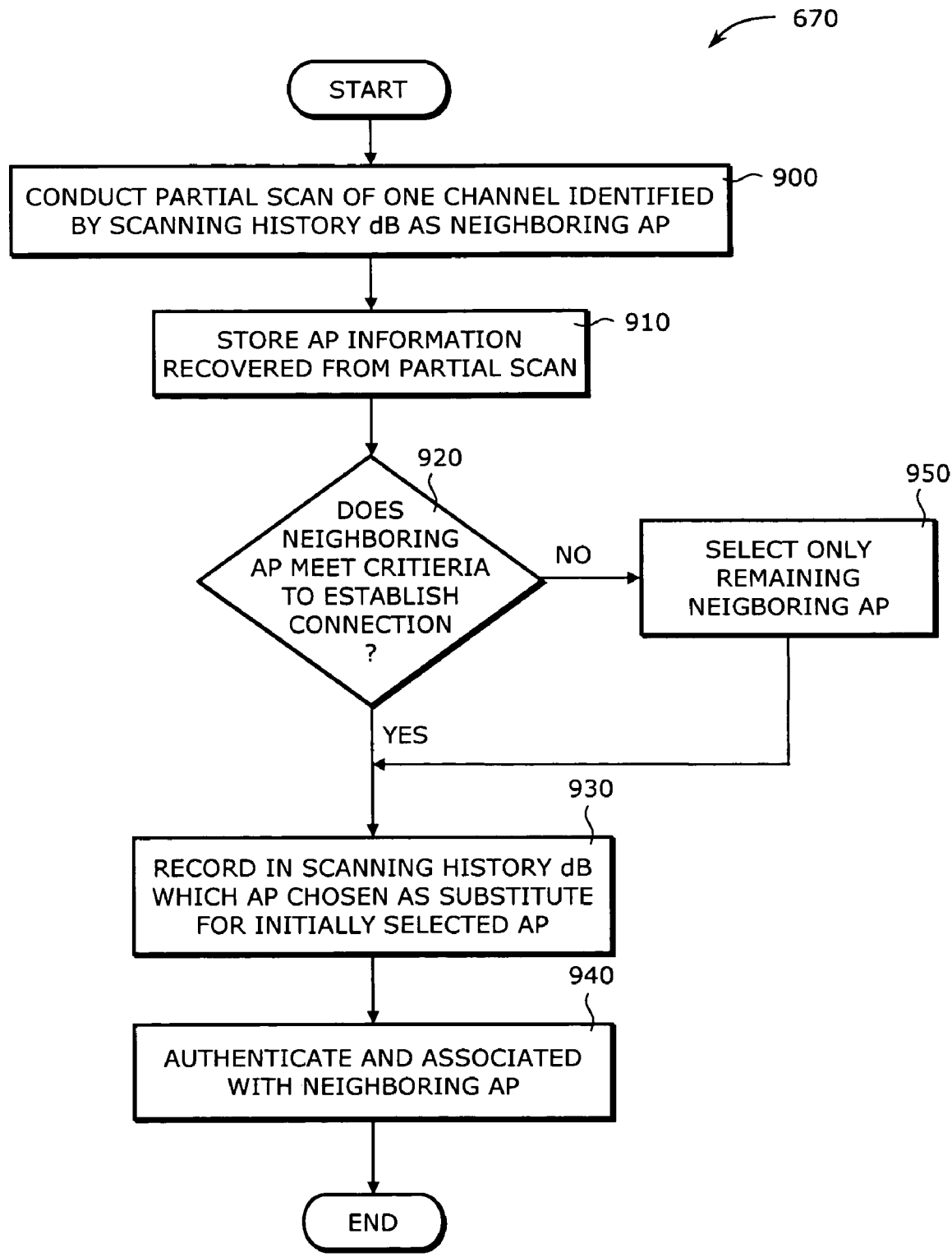
FIG. 6C is a third exemplary embodiment of a partial scanning process based on the scanning history and usage history stored within the scanning history database of FIG. 4.
Figure 6D:
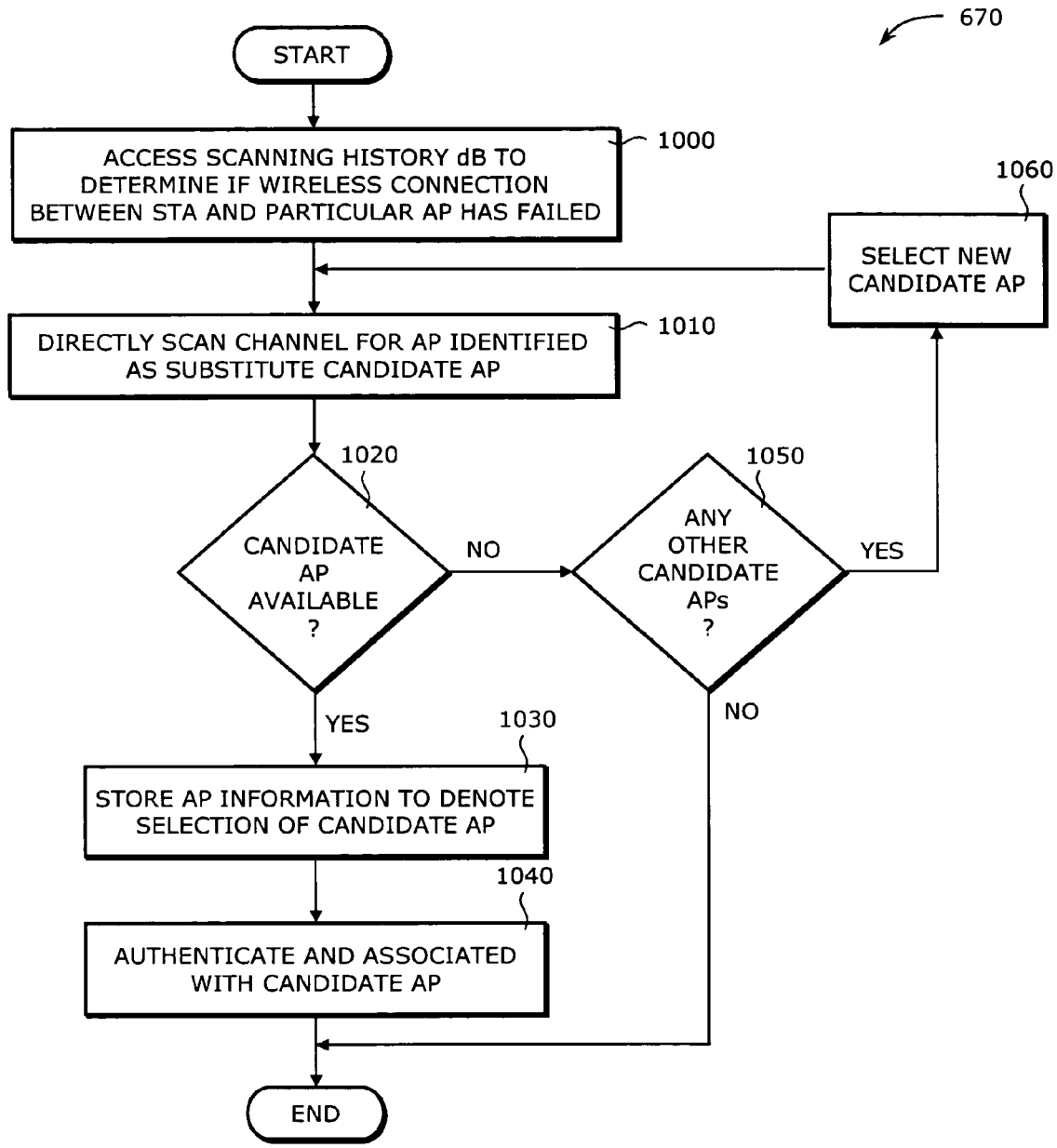
FIG. 6D is a fourth exemplary embodiment of a partial scanning process based on the scanning history and usage history stored within the scanning history database of FIG. 4.

Referring to FIG. 6C, a third exemplary embodiment of a partial scanning process based on the scanning history and usage history stored within the scanning history database of FIG. 4 is shown. At block 900, the STA conducts a partial scan of one channel identified by the scanning history database as a neighboring AP (AP1). The STA stores the AP information recovered and computed from the partial scan within the scanning history database (block 910). Thereafter, a determination is made whether the neighboring AP satisfies certain criteria so that the STA can establish a wireless connection with the neighboring AP (block 920). If so, the STA records within the scanning history database that the neighboring AP (AP1) was chosen as a substitute for a previously selected AP (AP2) (block 930). Such recordation may be prior to or after the STA authenticates and associates with the neighboring AP (block 940).

However, if the neighboring AP does not meet certain criteria to establish a connection, and only one neighboring AP (AP3) remains according to the scanning history database, the remaining neighboring AP is selected and STA attempts to authenticate and associate with the remaining neighboring AP without further scanning (block 950). If the remaining neighboring AP cannot provide an acceptable wireless connection, the STA conducts a full scan for all available APs on channels supported by the wireless network.

Referring now to 6D, a fourth exemplary embodiment of a partial scanning process based on the scanning history and usage history stored within the scanning history database of FIG. 4 is shown. The scanning history database is accessed by the STA to determine prior usage history as to chosen substitute APs when a wireless connection between the STA and a particular AP (AP4) fails (block 1000). The STA directly scans a channel of a substitute candidate AP (AP5) for the failed AP (block 1010). If the candidate AP is available, namely communications with the candidate AP would satisfy certain threshold requirements for establishing communications with the STA, the AP information from the candidate AP is recovered and computed for storage within the STA (blocks 1020 and 1030). The STA authenticates and associates with the candidate AP (block 1040).

However, if the candidate AP is unavailable, a determination is made whether other candidate APs (AP3) are listed in the scanning history database (block 1050). If so, a new candidate AP is selected and the partial scanning process commences again by conducting a direct channel scan of the new candidate AP and a determination whether the candidate AP is available (blocks 1060, 1010 and 1020). This direct partial scanning process continues until a candidate AP is detected, or the STA is forced to undergo a full scanning process when no candidate APs can provide a sufficient wireless connection with the STA.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for associating a wireless station with one of a plurality of access points of a wireless network, the method comprising: scanning a plurality of communication channels by the wireless station, the plurality of communication channels being used to transmit data from the plurality of access points of the wireless network, the wireless station comprises a wireless electronic device comprising logic that processes information and a wireless transceiver that receives information from and transmits information to an access point or another wireless station, and wherein the access point comprises a wireless electronic device that provides bi-directional connection between one or more wireless stations and a wired network; storing data obtained from each scan of the plurality of communication channels into a scanning history database that maps a plurality of neighboring access points for a first access point by creating a plurality of records, each record being associated with one of the plurality of access points, each record including access point selection results that indicate patterns of access point selection, the scanning history database also storing beacon timing information including beacon interval and beacon transmit time; constructing a mathematical network map that indicates a plurality of neighboring access points for each of the access points from access point information stored in said scanning history database; determining whether a wireless connection between the first access point and a wireless station has failed; in response to the wireless connection between the first access point and the wireless station failing, identifying a second access point in the scanning history database, the access point selection results for the second access point indicating that the second access point is normally chosen when the first access point becomes unavailable, and associating the wireless station with the second access point selected from the plurality of neighboring access points without rescanning prior to association based on information within the scanning history database; detecting a failure to associate the wireless station with the second access point; in response to a wireless connection between the second access point and the wireless station failing, conducting a partial scanning process that identifies a third access point, the partial scanning process being conducted on only a subset of available communication channels over which data is transmitted by the plurality of neighboring access points, the subset of available communication channels being determined by analysis of a mathematical network map, wherein the subset of available communication channels being determined by analysis of the mathematical network map includes access points listed in the scanning history database as reachable and having previously provided signals with a measured signal strength above a predetermined threshold, wherein a time of conducting the partial scanning process is based on beacon timing information; selecting the third access point based on a weighted analysis of the partial scanning results, the weighted analysis being based on at least signal strength, location, or up/down time; and associating the wireless station with the third access point.

2. The method of claim 1 further comprising: detecting a failure to associate the wireless station with the second access point; identifying a third access point in the scanning history database, the access point selection results for the third access point indicating that the third access point is chosen when the first access point becomes unavailable; and associating the wireless station with the third access point without rescanning prior to association.

3. The method of claim 2 further comprising recording the association of the third access point following the failure of the connection with the first access point in the scanning history database.

4. The method of claim 1 wherein determining whether a wireless connection between the first access point and a wireless station has failed further comprises detecting prolonged receipt of signals having a signal strength below a minimum threshold.

5. The method of claim 1 wherein said constructing a mathematical network map comprises utilizing geographical positions of APs to build said map.

6. The method of claim 1, further comprising: determining prior usage history indicating chosen substitute access points by accessing the scanning history database; directly scanning a channel of a given substitute candidate access point; in response to identifying that the given substitute candidate access point satisfies certain threshold requirements for establishing communication with the wireless station, storing corresponding access point information and associating with the given substitute candidate access point; and in response to identifying that the given substitute candidate access point fails satisfies certain threshold requirements for establishing communication with the wireless station, identifying other candidate access points listed in the scanning history database.

7. The method of claim 6, further comprising:
  wherein storing data obtained from each scan of the plurality of communication channels into the scanning history database includes storing scanning results that include capabilities of a transmitting access point, security policies supported by a specific access point, channel number, signal strength, and global positioning satellite (GPS) data that identifies a geographical position of the specific access point; the scanning history database also storing access point selection results that identify a likelihood that given certain access points are selected over other access points based on prior selection histories; and wherein detecting the failure includes detecting a dropout without the wireless station roaming to a different geographical position.

8. A wireless station comprising: a non-volatile memory; a wireless transceiver that receives messages from a plurality of access points of a wireless network and extracts data from the messages; and logic coupled to the non-volatile memory and the wireless transceiver, the logic performing operations including: scanning the data from a plurality of communication channels transmitted by the plurality of access points, storing data obtained from each scan of the plurality of communication channels into a scanning history database in the nonvolatile memory, the scanning history mapping a plurality of neighboring access points for a first access point by creating a plurality of records, each record being associated with one of the plurality of access points, each record including access point selection results that indicate patterns of access point selection, the scanning history database also storing beacon timing information including beacon interval and beacon transmit time; constructing a mathematical network map that indicates a plurality of neighboring access points for each of the access points from access point information stored in said scanning history database, determining whether a wireless connection between the first access point and a wireless station has failed: in response to the wireless connection between the first access point and the wireless station failing, identifying the second access point in the scanning history database, the access point selection results for the second access point indicating that the second access point is normally chosen when the first access point becomes unavailable, and associating the wireless station with the second access point selected from the plurality of neighboring access points without rescanning prior to association based on information within the scanning history database, detecting a failure to associate the wireless station with the second access point; in response to a wireless connection between the second access point and the wireless station failing, conducting a partial scanning process that identifies a third access point, the partial scanning process being conducted on only a subset of available communication channels over which data is transmitted by the plurality of neighboring access points, the subset of available communication channels being determined by analysis of a mathematical network map, wherein the subset of available communication channels being determined by analysis of the mathematical network map includes access points listed in the scanning history database as reachable and having previously provided signals with a measured signal strength above a predetermined threshold, wherein a time of conducting the partial scanning process is based on beacon timing information; selecting the third access point based on a weighted analysis of the partial scanning results, the weighted analysis being based on at least signal strength, location, or up/down time; and associating the wireless station with the third access point.

9. The wireless station of claim 8 wherein the logic further performs operations including detecting a failure to associate the wireless station with the second access point, identifying a third access point in the scanning history database, the access point selection results for the third access point indicating that the third
access point is chosen when the first access point becomes unavailable; associating the wireless station with the third access point without rescanning prior to association; and wherein the logic further performs operations including recording the association of the third access point following the failure of the connection with the first access point in the scanning history database.

10. The wireless station of claim 8 wherein determining whether a wireless connection between the first access point and a wireless station has failed further comprises detecting prolonged receipt of signals having a signal strength below a minimum threshold.

11. The wireless station of claim 8 wherein said constructing a mathematical network map comprises utilizing geographical positions of APs to build said map.

12. A method for associating a wireless station with one of a plurality of access points of a wireless network, the method comprising: acquiring a scanning history database that maps a plurality of neighboring access points for a first access point by creating a plurality of records, each record being associated with one of the plurality of access points, each record including access point selection results that indicate patterns of access point selection, the scanning history database also storing beacon timing information including beacon interval and beacon transmit time; determining whether a wireless connection between the first access point and a wireless station has failed; in response to the wireless connection between the first access point and the wireless station failing, identifying the second access point in the scanning history database, the access point selection results for the second access point indicating that the second access point is normally chosen when the first access point becomes unavailable, and associating the wireless station with the second access point selected from the plurality of neighboring access points without rescanning prior to association, wherein a wireless station comprises a wireless electronic device comprising logic for processing information and a wireless transceiver for receiving information from and transmitting information to an access point or another wireless station, and wherein an access point comprises a wireless electronic device that provides bi-directional connection between one or more wireless stations and a wired network; detecting a failure to associate the wireless station with the second access point; in response to a wireless connection between the second access point and the wireless station failing, conducting a partial scanning process that identifies a third access point, the partial scanning process being conducted on only a subset of available communication channels over which data is transmitted by the plurality of neighboring access points, the subset of available communication channels being determined by analysis of a mathematical network map, wherein the subset of available communication channels being determined by analysis of the mathematical network map includes access points listed in the scanning history database as reachable and having previously provided signals with a measured signal strength above a predetermined threshold, wherein a time of conducting the partial scanning process is based on beacon timing information; selecting the third access point based on a weighted analysis of the partial scanning results, the weighted analysis being based on at least signal strength, location, or up/down time; and associating the wireless station with the third access point.

13. The method of claim 12 further comprising: detecting a failure to associate the wireless station with the second access point; identifying a third access point in the scanning history database, the access point selection results for the third access point indicating that the third access point is chosen when the first access point becomes unavailable; associating the wireless station with the third access point without rescanning prior to association; and recording the association of the third access point following the failure of the connection with the first access point in the scanning history database.

14. The method of claim 10 wherein determining whether a wireless connection between the first access point and a wireless station has failed further comprises detecting prolonged receipt of signals having a signal strength below a minimum threshold.

15. The method of claim 12 wherein said patterns of access point selection include patterns where one AP is selected after a previous AP becomes unavailable.

16. A wireless station comprising: a non-volatile memory; a wireless transceiver that receives messages from a plurality of access points of a wireless network and extracts data from the messages; and logic coupled to the non-volatile memory and the wireless transceiver, the logic performing operations including: acquiring a scanning history database that maps a plurality of neighboring access points for a first access point by creating a plurality of records, each record being associated with one of the plurality of access points, each record including access point selection results that indicate patterns of access point selection, the scanning history database also storing beacon timing information including beacon interval and beacon transmit time; storing the scanning history database in the non-volatile memory; determining whether a wireless connection between the first access point and the wireless station has failed; in response to the wireless connection between the first access point and the wireless station has failed failing, identifying the second access point in the scanning history database, the access point selection results for the second access point indicating that the second access point is normally chosen when the first access point becomes unavailable, and associating the wireless station with the second access point selected from the plurality of neighboring access points without rescanning prior to association; detecting a failure to associate the wireless station with the second access point; in response to a wireless connection between the second access point and the wireless station failing, conducting a partial scanning process that identifies a third access point, the partial scanning process being conducted on only a subset of available communication channels over which data is transmitted by the plurality of neighboring access points, the subset of available communication channels being determined by analysis of a mathematical network map, wherein the subset of available communication channels being determined by analysis of the mathematical network map includes access points listed in the scanning history database as reachable and having previously provided signals with a measured signal strength above a predetermined threshold, wherein a time of conducting the partial scanning process is based on beacon timing information; selecting the third access point based on a weighted analysis of the partial scanning results, the weighted analysis being based on at least signal strength, location, or up/down time; and associating the wireless station with the third access point.

17. The wireless station of claim 16 wherein the logic further performs operations including detecting a failure to associate the wireless station with the second access point, identifying a third access point in the scanning history database, the access point selection results for the third access point indicating that the third access point is chosen when the first access point becomes unavailable; associating the wireless station with the third access point without rescanning prior to association; and wherein the logic further performs operations including recording the association of the third access point following the failure of the connection with the first access point in the scanning history database.

18. The wireless station of claim 16 wherein determining whether a wireless connection between the first access point and a wireless station has failed further comprises detecting prolonged receipt of signals having a signal strength below a minimum threshold.

19. The wireless station of claim 16 wherein said patterns of access point selection include patterns where one AP is selected after a previous AP becomes unavailable.

* * * * *